United States Patent [19]

Armitage

[11] 3,972,151
[45] Aug. 3, 1976

[54] METHOD AND APPARATUS FOR SHAPING TUNGSTEN-CARBIDE BLANKS

[76] Inventor: Harry J. Armitage, 1546 Cavitt Road, Monroeville, Pa. 15146

[22] Filed: Apr. 7, 1975

[21] Appl. No.: 565,667

Related U.S. Application Data

[63] Continuation-in-part of Ser. No. 409,314, Oct. 24, 1973, Pat. No. 3,892,090.

[52] U.S. Cl. .......................... 51/50 PC; 51/101 R; 51/277; 51/281 R
[51] Int. Cl.² ...................... B24B 1/00; B24B 5/16
[58] Field of Search ................ 51/101 R, 277, 50 R, 51/51, 237, 327, 217, 48 R, 50 H, 50 PC, 56 R, 281 R, 281 C, 290

[56] References Cited
UNITED STATES PATENTS

| | | | |
|---|---|---|---|
| 1,051,869 | 2/1913 | Eckstein | 51/277 |
| 2,786,312 | 3/1957 | Armitage | 51/101 R |
| 3,027,693 | 4/1962 | Armitage | 51/277 |
| 3,434,245 | 3/1969 | Stuart | 51/237 R |

*Primary Examiner*—Al Lawrence Smith
*Assistant Examiner*—Nicholas P. Godici
*Attorney, Agent, or Firm*—Hymen Diamond

[57] ABSTRACT

The work is a vertical stack of blanks clamped between centers of a head-stock and a tail-stock rather than being supported from a center. The stack so clamped is rotated coaxially with a cam in engagement with a rotating grinding wheel. The cam is rotated in engagement with a rotating cam follower. The assembly including the stack and cam is suspended from a heavy rigid rocker support which is pivoted in accordance with the contour of the cam as the cam is displaced laterally by the cam follower.

8 Claims, 14 Drawing Figures

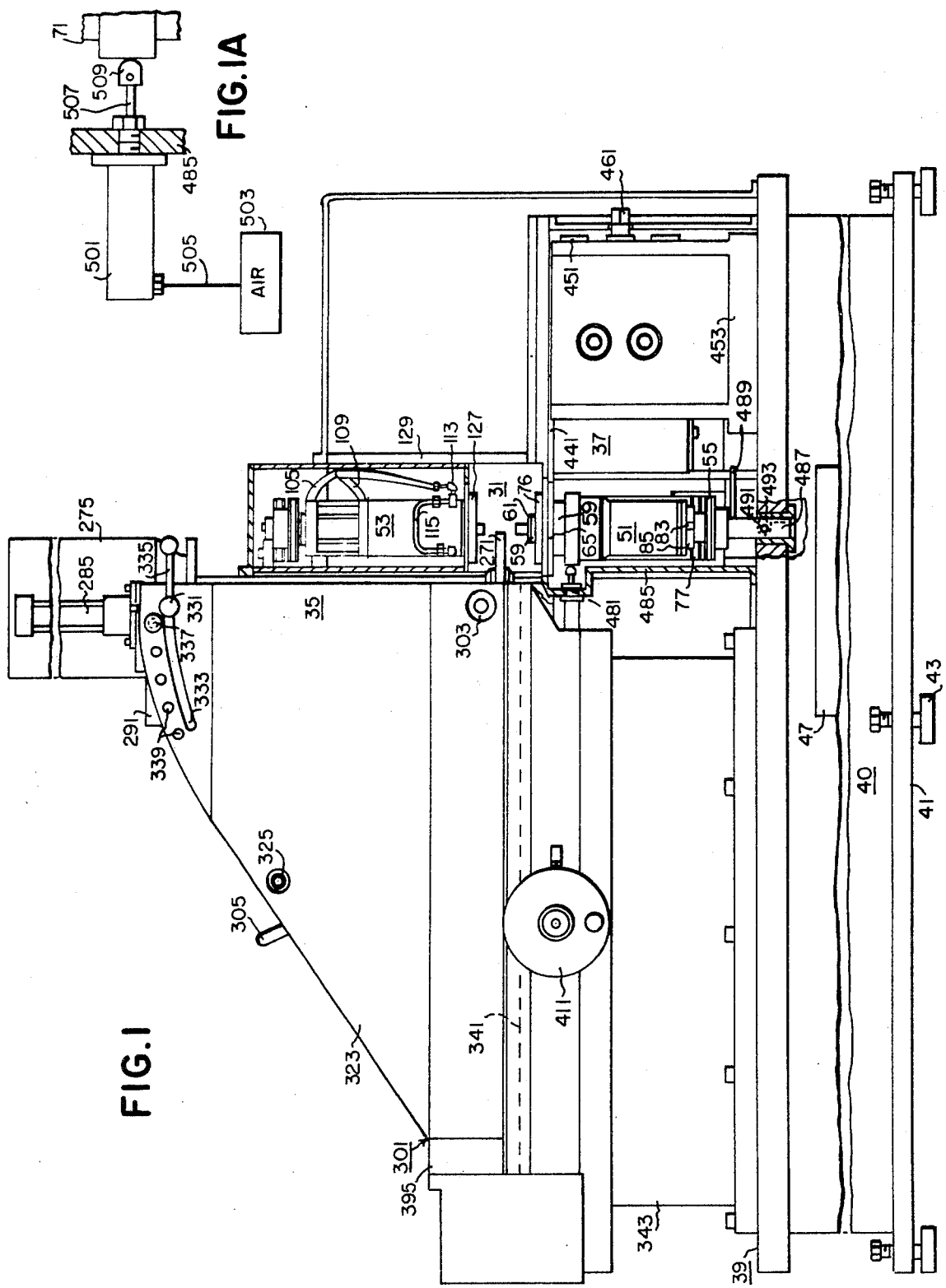

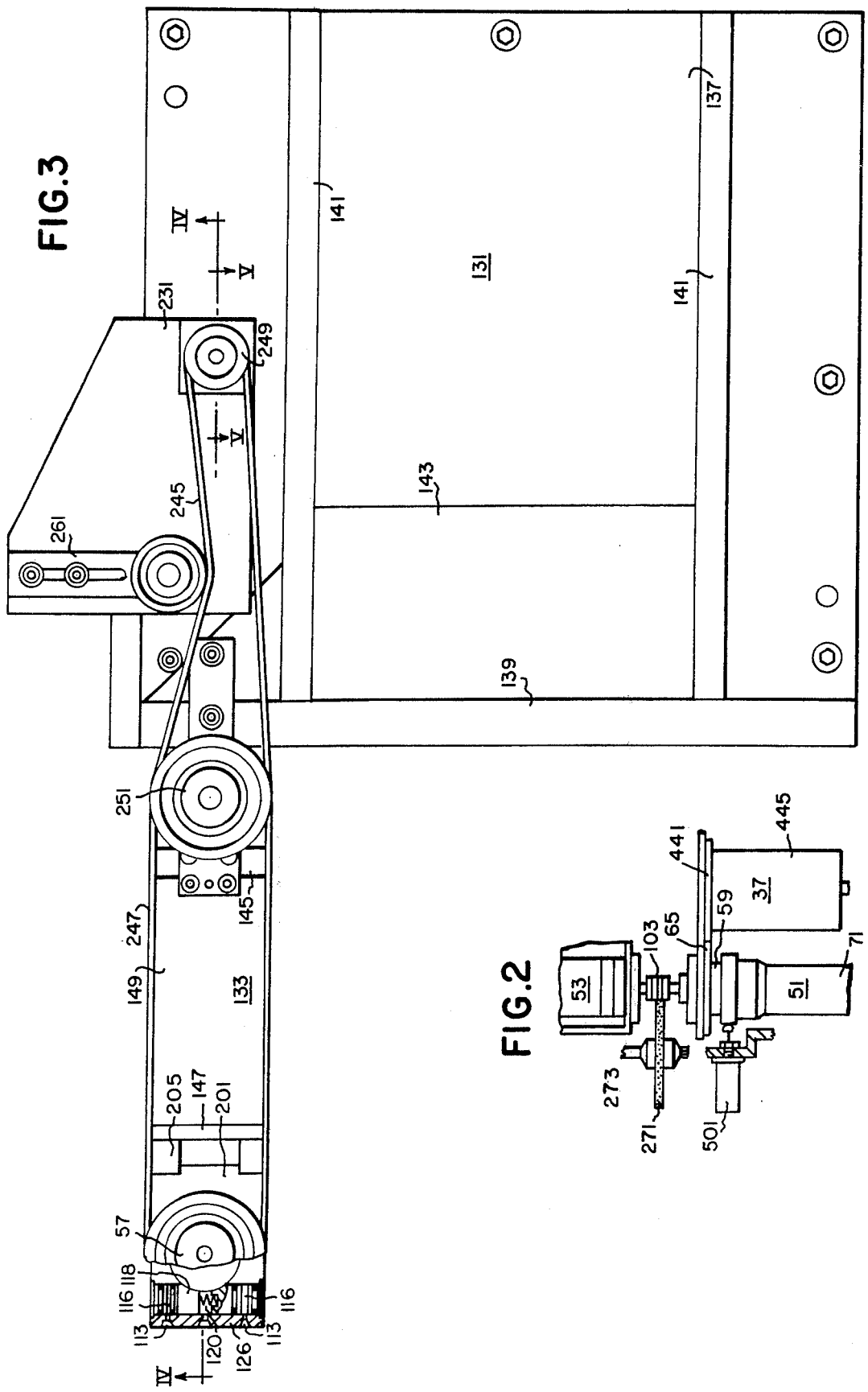

METHOD AND APPARATUS FOR SHAPING TUNGSTEN-CARBIDE BLANKS

REFERENCE TO RELATED APPLICATION

This application is a continuation-in-part of application Ser. No. 409,314 filed Oct. 24, 1973 and now U.S. Pat. No. 3,892,090 to Harry J. Armitage for WORK SHAPING APPARATUS.

BACKGROUND OF THE INVENTION

This invention relates to work forming or work shaping in the practice of which work blanks, typically of tungsten carbide or the like, are ground to a predetermined contour. This invention has particular relationship to such work forming in which grinding is controlled by a cam which causes the grinding wheel and the work to move towards and away from each other so that the desired contour of the work is produced automatically. Typical of the teachings of the prior art relating to work forming or shaping of this type are Pat. Nos. 2,932,133 and 3,027,693 to Harry J. Armitage. These patents disclose the gang grinding controlled by a cam as disclosed above of a horizontal stack of blanks to form bits or inserts of the desired contour. The horizontal stacking of the work does not lend itself to automatic operation in which, once a stack of blanks is ground to the desired contour, it is automatically replaced by another stack of blanks. In addition, where the work is of substantial length, for example a long stack of blanks, the work tends to sag under gravity and this militates against the formation of bits of the high precision demanded by modern industry.

It is an object of this invention to overcome the above disadvantages of the prior art and to provide work-shaping apparatus and a method of work-shaping, particularly for gang grinding a stack of blanks, which work-shaping apparatus and method shall readily lend itself to the automatic handling of such work.

SUMMARY OF THE INVENTION

In accordance with this invention the blanks are clamped vertically with adequate force to assure that the stack will not buckle. The surfaces of the blanks are clean and flat and under pressure the molecules of engaging surfaces exert high attractive forces (Armitage '133 Col. 2, lines 56–63). These forces need be particularly high where tungsten-carbide bits or inserts are being formed and enormous lateral (horizontal) forces are applied during the shaping operation. Since tungsten carbide is capable of resisting high pressures, it is not crushed by the high holding force which is demanded. These vertical stacking of the blanks facilitates automatic handling since the blanks for each new stack need only be stacked by a vertical stacking facility preparatory to being automatically moved and then clamped between the centers of the head-stock and tail-stock of a grinding machine.

Typically the bulk of blanks being ground to form tungstencarbide bits have thicknesses between one-eighth inch and one-half inch although a small percentage of such blanks may have a thickness as high as three-fourths inch. Typically the stacks have a length of about 2 inches so that there usually are between 4 and 16 blanks to the stack. However, the stacks may have a length as high as 4 inches. A 4-inch stack demands a very high clamping force and cannot be used unless facilities are available to provide such a force.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 1 is a view in side elevation of apparatus according to this invention;

FIG. 1A is a view generally diagrammatic showing the manner in which constant pressure is impressed against the action of the flexing pivot of the apparatus shown in FIG. 1;

FIG. 2 is a fragmental view in side elevation showing the relationship between the work, stacked in accordance with this invention, the grinding wheel, the cam and the cam follower;

FIG. 3 is a plan view, with a fragmentary part broken away and sectioned, of the part of the apparatus shown in FIG. 1 including the work-clamping means and its pivotal support including the flexing or resilient pivot;

DETAILED DESCRIPTION OF EMBODIMENT

Figure 4:
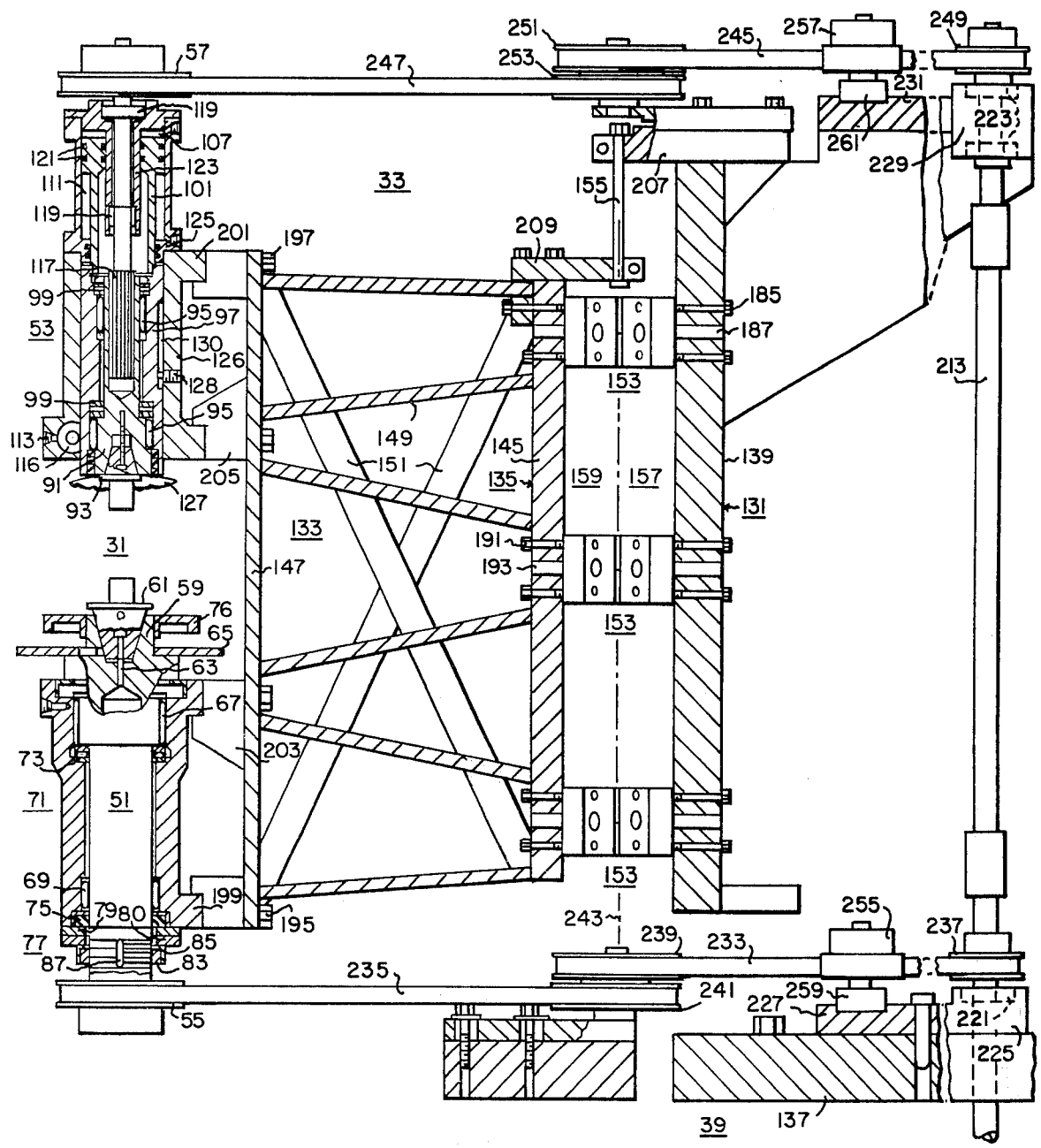
FIG. 4 is a view in section taken along line IV—IV of FIG. 3.

The apparatus shown in the drawings includes a work-clamping assembly 31 (FIG. 1), a flexible suspension 33 (FIG. 4) for the work-clamping assembly 31, a grinding-wheel assembly 35 (FIGS. 1 and 18), a feed 36 (FIG. 23) for the grinding wheel, and a cam follower assembly 37 (FIG. 1). This apparatus is mounted on the table 39 of the machine base 40 having a supporting plate 41 on leveling pads 43. The machine base 40 has an enclosure 45 with access doors 47 for electrical and hydraulic parts.

The work-clamping assembly 31 includes a head-stock 51 (FIGS. 1 and 4) and a tail-stock 53 both driven through pulleys 55 and 57 (FIG. 4) respectively. In FIGS. 1 and 4 the head-stock 51 and tail-stock 53 are shown retracted. The head-stock 51 includes a spindle 59 having a center 61. The center 61 is secured centrally to the spindle 59 by bolt 63 (FIG. 4). This spindle 59 may be described as the cam shaft as the cam 65 is secured to a shoulder on this shaft and is rotatable therewith. The cam shaft 59 is rotatable on roller bearings 67 and 69 (FIG. 4) in a housing 71 and on thrust roller bearings 73 between the housing 71 and a shoulder on the shaft 59. Oil seals 75 are provided between the shaft 59 and the housing 71. A seal 76 is also provided to prevent the penetration of particles from the grinding operation and other matter into the rotating parts.

A brake 77 is provided for preventing abrupt movement over regions of small radius of the cam 65. This brake 77 includes a disk brake 79 secured to housing 71 which is engaged by a plate brake 80. The plate brake 80 and disk brake 79 are urged into engagement by a lock-nut 83 and lock-washer 85, the washer being secured adjustably in key-slot 87.

The tail-stock (FIGS. 1 and 4) includes a spindle 91 having a center 93 which is rotatable in roller bearings 95 in a sleeve 97. The sleeve 97 and spindle 91 also carry cooperative thrust roller bearings 99. The spindle 91 and the sleeve 97 and their bearings 95 and 99 are moveable downwardly or upwardly by hydraulically actuable piston 101 so that the work 103 (FIG. 2) may be clamped between the head-stock 51 and the tail-stock 53, or the head-stock and tail-stock retracted. The fluid pressure for clamping is supplied through conductor 105 (FIG. 1) into cavity 107 (FIG. 4) and for retracting through conductor 109 (FIG. 1) into cavity 111. During the clamping back pressure supplies fluid through fitting 113 (FIGS. 1, 3 and 4) and channel 115 (FIG. 1) into cavities 116 (FIG. 3) to lock the tail-stock 53 in the clamping position and prevents movement of the tail-stock generally perpendicularly to its axis. The back pressure moves pistons 118 inwardly against the action of spring 120. The pistons 118 engage and clamp sleeve 97. The spindle 91 is driven by a splined shaft 117 (FIG. 4) rotated in bearings 119 by pulley 57. O-ring seals 121 are provided between piston 101 and a sleeve 123 in which splined shaft 117 is rotated and between piston 101 and a sleeve 125 in housing 126 to prevent penetration of the hydraulic fluid. Set screw 128 in keyway 130 prevents rotation of sleeve 97. The center 93 is shielded from debris by a bellows 127 which is connected to the sleeve 97 at its moveable rim and to the guard 129 (FIG. 1) for the tail-stock 53 at the fixed end.

In the practice of this invention the work is clamped vertically. This orientation of the work has the advantage that it facilitates automatic handling of the work since the blanks need only be stacked by a stacking facility. In addition, work of substantial length, for example a long stack of blanks, when supported vertically does not sag under gravity as it would when supported horizontally. It is emphasized that the vertical orientation of the work secured between the head-stock 51 and the tail-stock 53, rather than supported from a center (for example magnetic center) is unique. So supported the work is not displaced by the large forces which are impressed during the grinding operation.

The flexible or rocker suspension 33 (FIG. 4) for the work-clamping assembly 31 (FIG. 4) includes a rigid massive fixed support 131, a rigid massive rocker support 133 and flexible or resilient connecting assembly 135 for suspending the rocker support 133 from the fixed support 131. The connecting assembly 135 serves as a flexing pivot about which the rocker support 133 rocks.

Figure 6:
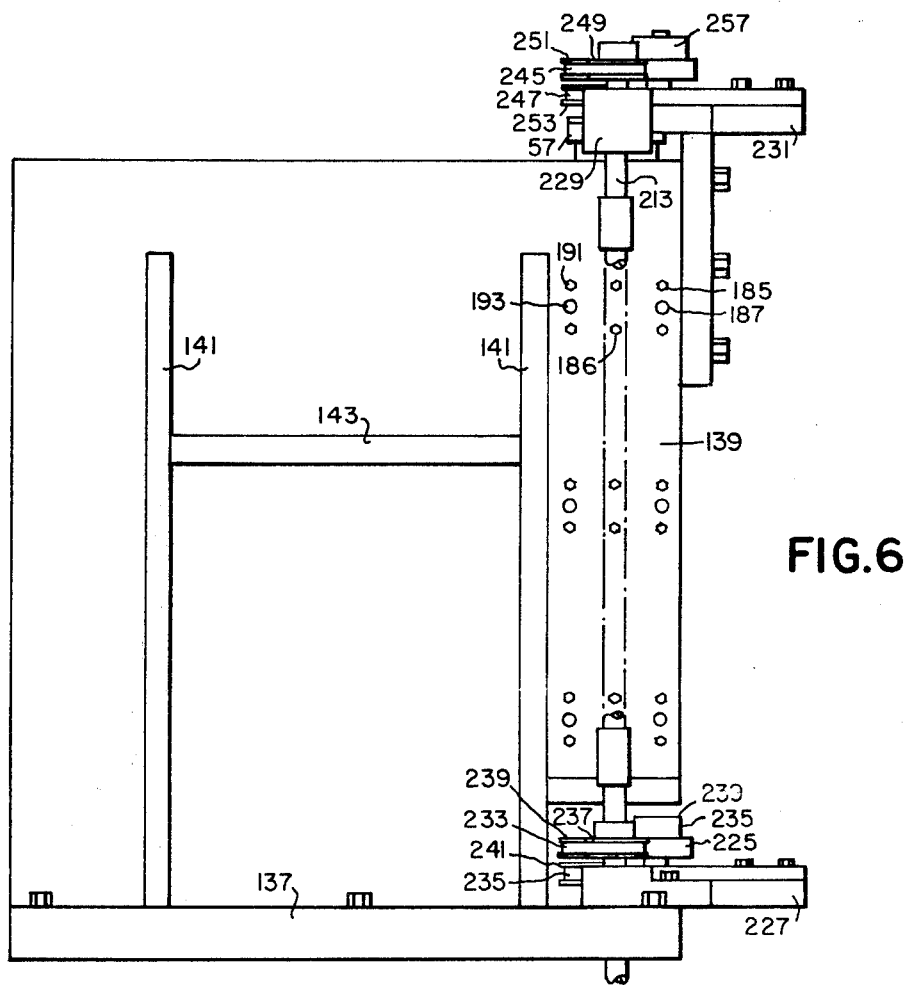
FIG. 6 is a view in end elevation of the part of the apparatus shown in FIG. 3.
Figure 7:
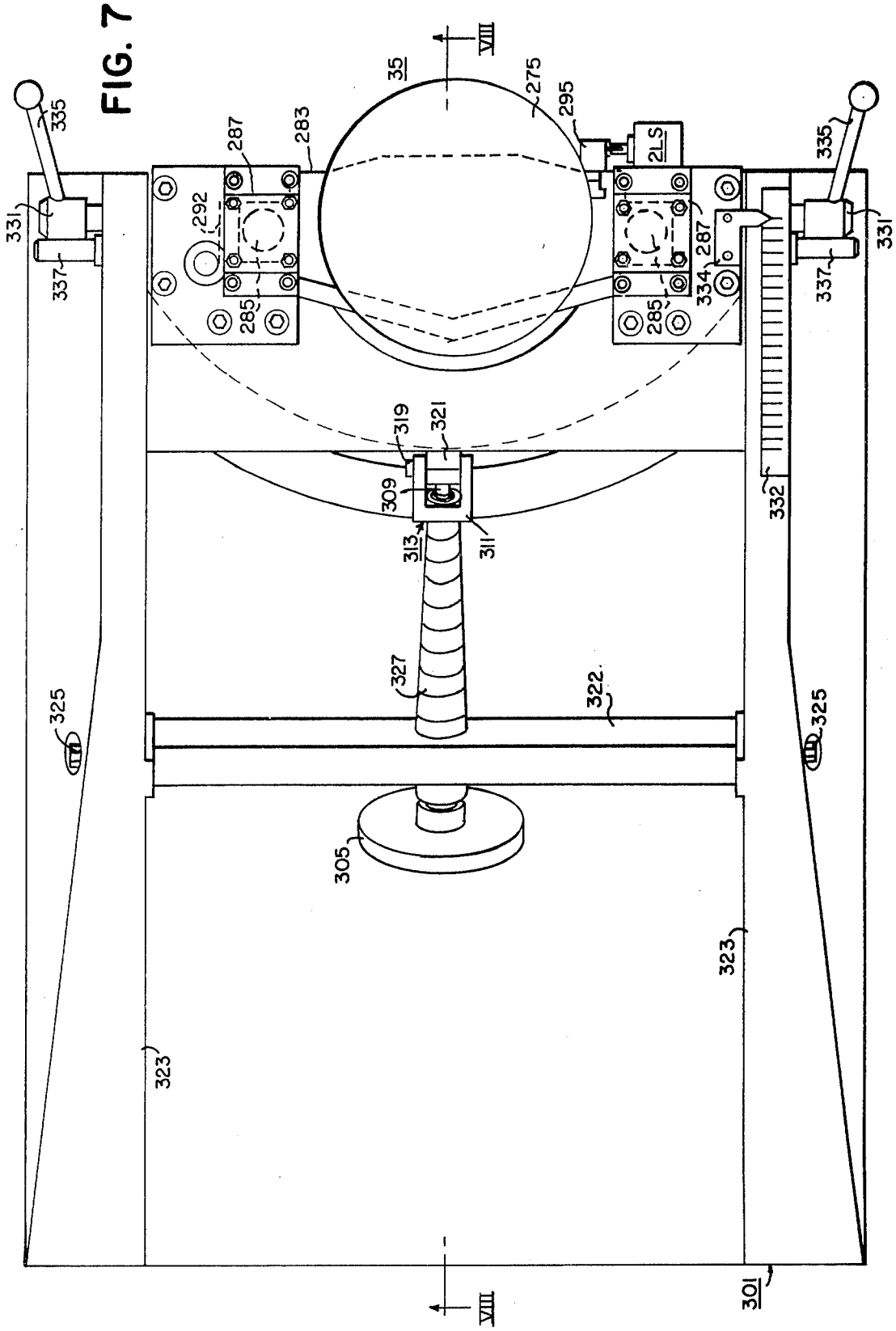
FIG. 7 is a plan view of the grinding wheel support of the apparatus shown in FIG. 1.
Figure 8:
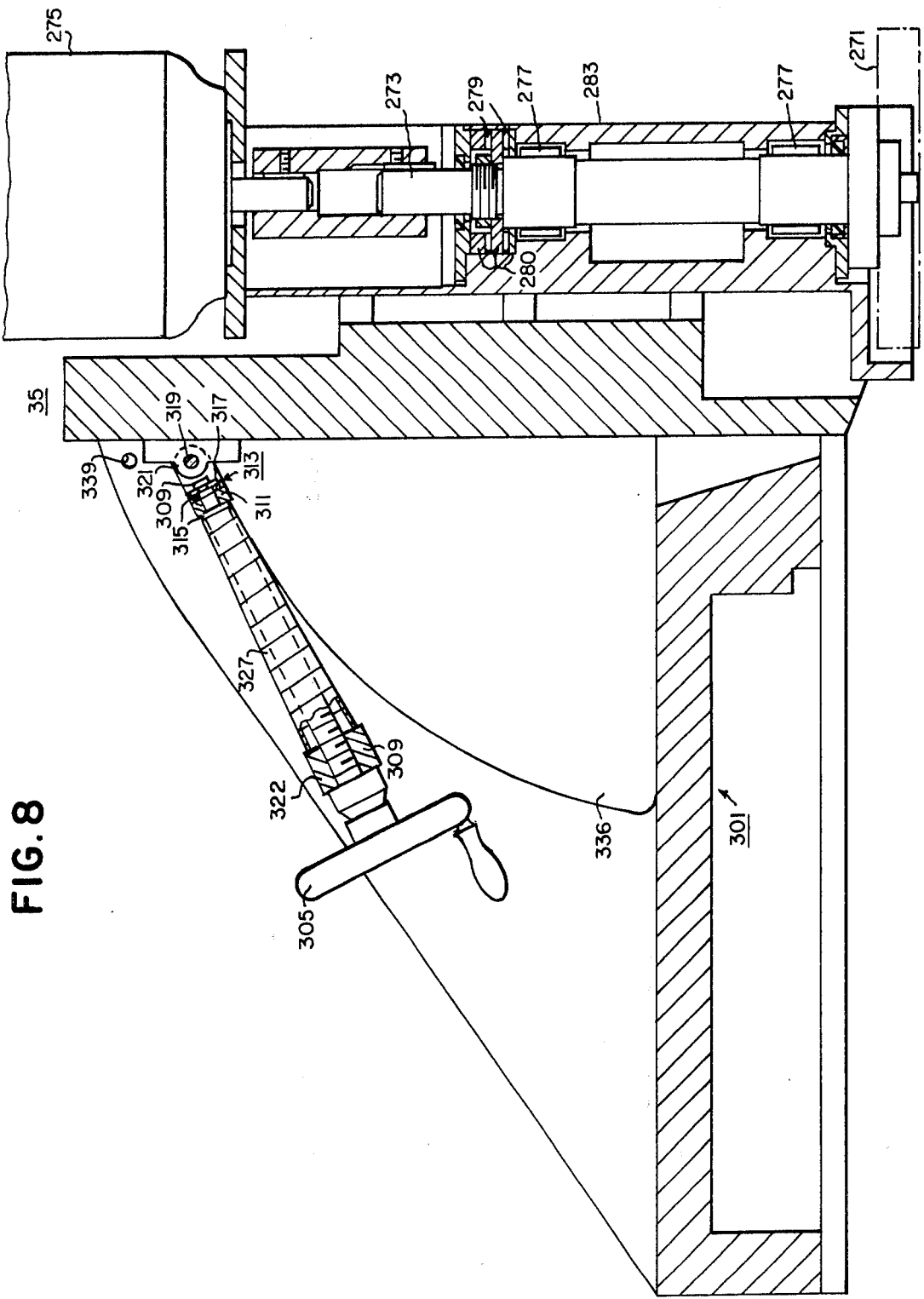
FIG. 8 is a view taken along line VIII—VIII of FIG. 7.

The fixed support 131 includes an angle plate having a base 137 (FIG. 6) secured to the table 39 and a vertical plate 139. The vertical plate 139 is strengthened by gussets 141 between which a strengthening plate 143 (FIG. 6) extends.

The rocker support 133 includes a pair of plates 145 and 147 to which strengthening cross plates 149 and diagonal plates 151 are welded to form a rigid massive structure.

The flexible or resilient suspension 135 (FIG. 4) includes a plurality of flexible pivots 153 described in detail in the parent patent and a torsion rod 155.

Figure 5:
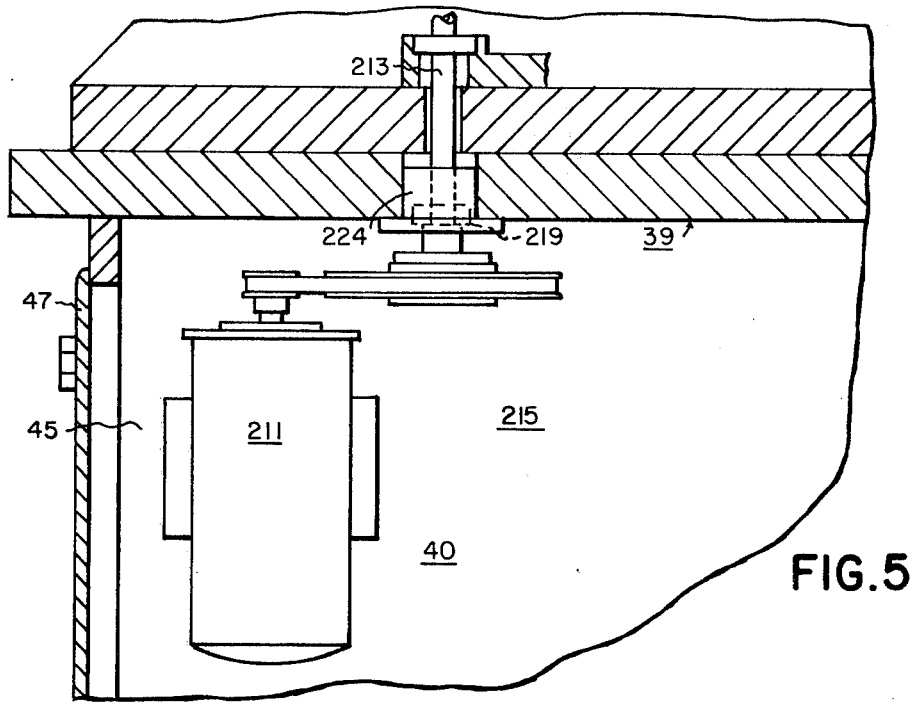
FIG. 5 is a view in section taken along line V—V of FIG. 3.

The head-stock 51 and tail-stock 53 are rotated through the pulleys 55 and 57 (FIG. 4) from a motor 211 (FIG. 5) mounted in the enclosure 45 of the machine base 40. The motor 211 drives a shaft 213 through reduction belt drive 215. The shaft 213 is rotatable in bearings 219, 221, 223 (FIG. 4). The bearings 219 are mounted in a sleeve 224 (FIG. 5) in table 39 engaging a shoulder on shaft 213. The bearings 221 are mounted in a boss 225 (FIGS. 4, 6) of bracket 227 secured to base 137; the bearings 223 are mounted in a boss 229 of an angle bracket 231 secured to plate 139.

The head-stock 51 is rotated by a belt drive including belts 233, 235 (FIG. 4), pulley 237 on shaft 213, pulleys 239 and 241 approximately coaxial with the axis 243 of the flexing pivot 135, and the pulley 55. The tail-stock 53 is rotated by a belt drive including belts 245 and 247, pulley 249 on shaft 213, pulleys 251 and 253 approximately coaxial with the axis 243 and the pulley 57. Belts 233 and 245 are maintained tight by idler pulleys 255 and 257 respectively. Pulley 255 is adjustably mounted on bracket 259 and pulley 257 on bracket 261. The belts 233, 235, 245, 247 are timing belts having teeth which mesh with the teeth in pulleys 237, 239, 241, 55 and 249, 251, 253, 57. Since the motor 211 is mounted on a plate in enclosure 45 (FIG. 5) the rocker support 133 is relieved of carrying the weight of the motor. The pulleys 239, 241 and 251, 253 are approximately centered on the axis 243 so that the drive is not affected by the rocking of the rocker support 133.

Figure 9:
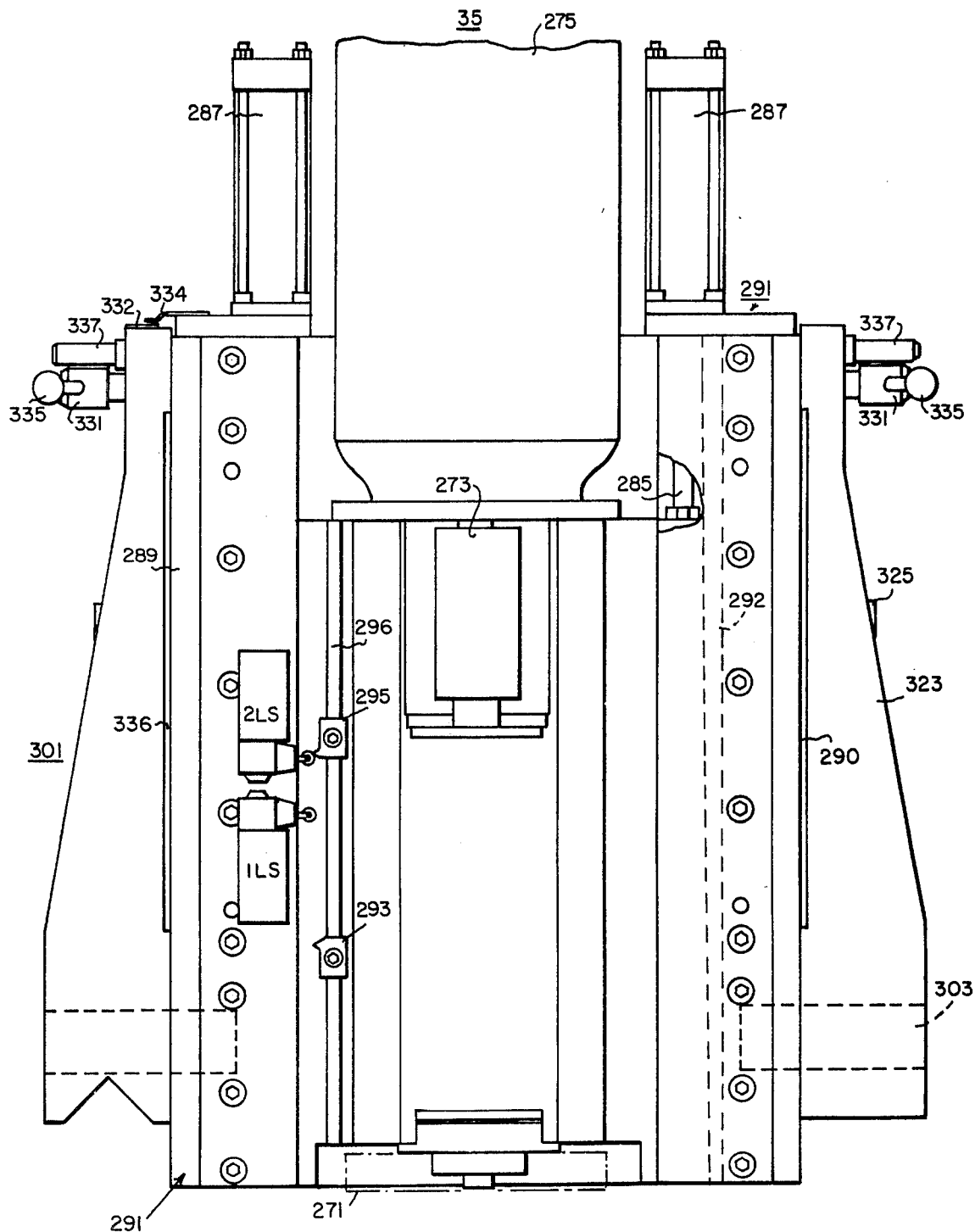
FIG. 9 is a view in end elevation of the part of the apparatus shown in FIG. 8.

The grinding wheel assembly 35 (FIGS. 1 and 7–9) includes the grinding wheel 271 which is secured to shaft 273 driven by motor 275. Shaft 273 is rotatable in roller bearings 277 and is provided with thrust needle bearings 279 which operate against races 280. The motor 275 is mounted on, and the bearings 277 are mounted in, slide 283. Slide 283 is actuable by pistons 285 (FIG. 9) in cylinders 287 to slide upwardly or downwardly along the stack 103 (FIG. 2) on ways 289 and 290 in wheel-head housing 291 and carries with it the motor 275, shaft 273 and grinding wheel 271. A gib 292 is interposed between way 290 and slide 283. Dogs 293 and 295 are adjustably mounted in a T slot 296 which is carried with the slide 283. Dog 293 actuates limit switch 1LS and dog 295 limit switch 2LS which are mounted on the wheel-head housing 283.

The wheel-head housing 291 is pivotally mounted in horizontal slide 301 on pins 303 (FIG. 9) and is pivotal or tiltable over a limited angle so that the grinding wheel 271 may be set at an angle to the work. The angle of tilt is set by handwheel 305. The handwheel 305 carries an adjusting screw having an unthreaded tip 309 which is rotatably secured to the cross-member 311 of a clevis or trunnion 313 between washers 315 one of which engages the shoulder of the screw from which the tip 309 extends and also the cross member 311, and the other of which is engaged by a ring retainer 317 in a groove in the tip 309. Between its legs the clevis carries a pivoting pin 319 pivotal in a bearing block 321. The clevis 313 is thus pivotally suspended from a block 321 secured to wheel-head housing 291. A tye-bar 322 is pivotally mounted between the vertical walls 323 of horizontal slide 291 on pins 325. The screw 307 engages the tye-bar 322. The screw is provided with a cover 327 (typically an elasticon cover). Rotation of tilting handwheel 305 so that the outer end of the screw 307 moves outwardly tilts the wheel-head housing and the grinding wheel 271 counterclockwise; rotation of the handwheel 305 so that the outer end moves inwardly tilts the wheel-head housing clockwise.

For locking the wheel-head housing 291 in an angular position locking screws or threaded pins 331 (FIGS. 1, 7, 9) are provided in each wall 323. The screws 331 extend through slots 333 in the walls and engage threaded holes (not shown) in the wheel-head housing 291. Each locking screw 331 is secured in any position by a handle 335. In selected discrete positions, typically at intervals of 5°, the wheel-head housing is also secured by locating pins 337 which pass through holes 339 in walls 323 and engage holes (not shown) in wheel-head housing 291. The wheel-head housing 291 may also be secured by locking screw 331 in intermediate positions. A scale 332 and pointer 334 are provided to indicate the angular position of the wheel-head housing 291 in degrees. To facilitate the tilting a space 336 is provided between the wheel-head housing 291 and the horizontal slide 301.

The horizontal slide 301 is slideable away from and towards the work 103 on ways 341 and 342 (FIGS. 1 and 10, 12) extending from a support 343 secured to table 39. By moving the horizontal slide the grinding wheel 271 may be moved toward and away from the work 103 at a low measured time rate and it may also be moved into grinding position or out of grinding position rapidly. The latter movement is called rapid traverse. The movement is accomplished by the wheel-head feed 36 (FIGS. 10, 11, 12) which is contained in wheel-head feed housing 352. This drive includes a hydraulic motor 351 suspended from gear box 353 secured to the rim of an opening in table 355 of support 343. On the shaft 357 of the motor 351 there is an index plate or detent disk 359 and a spur gear or pinion 361 which are rotatable together. The disk 359 includes detents 363 at precise intervals which are selectively engageable by a stop-pin 364 slideable in bushing 366 by a plunger 365 in cylinder 367. The plunge 365 may be set to actuate pin 364 to engage in detent 363 after the disk 359 has been rotated through a preselected number of detents. The pinion 361 drives a shaft 371 through a spur gear 373 at reduced speed. Shaft 371 drives another shaft 375 at further reduced speed through gears 376 and 378. Shaft 375 carries a worm 377 which drives a worm wheel 379 rotating shaft 381. Shaft 381 drives ball screw 383 whose thread meshes with ball nut 385. Ball nut 385 engages feed-bar 387. Ball screw 383 is rotatably supported by its stem 389 in common with shaft 381 on bearings 391 and on bearings 393 in horizontal slide extension 395. The connection between stem 389 and shaft 381 is a splined connection so that ball screw 383 and its stem 389 can slide relative to shaft 381.

Figure 10:
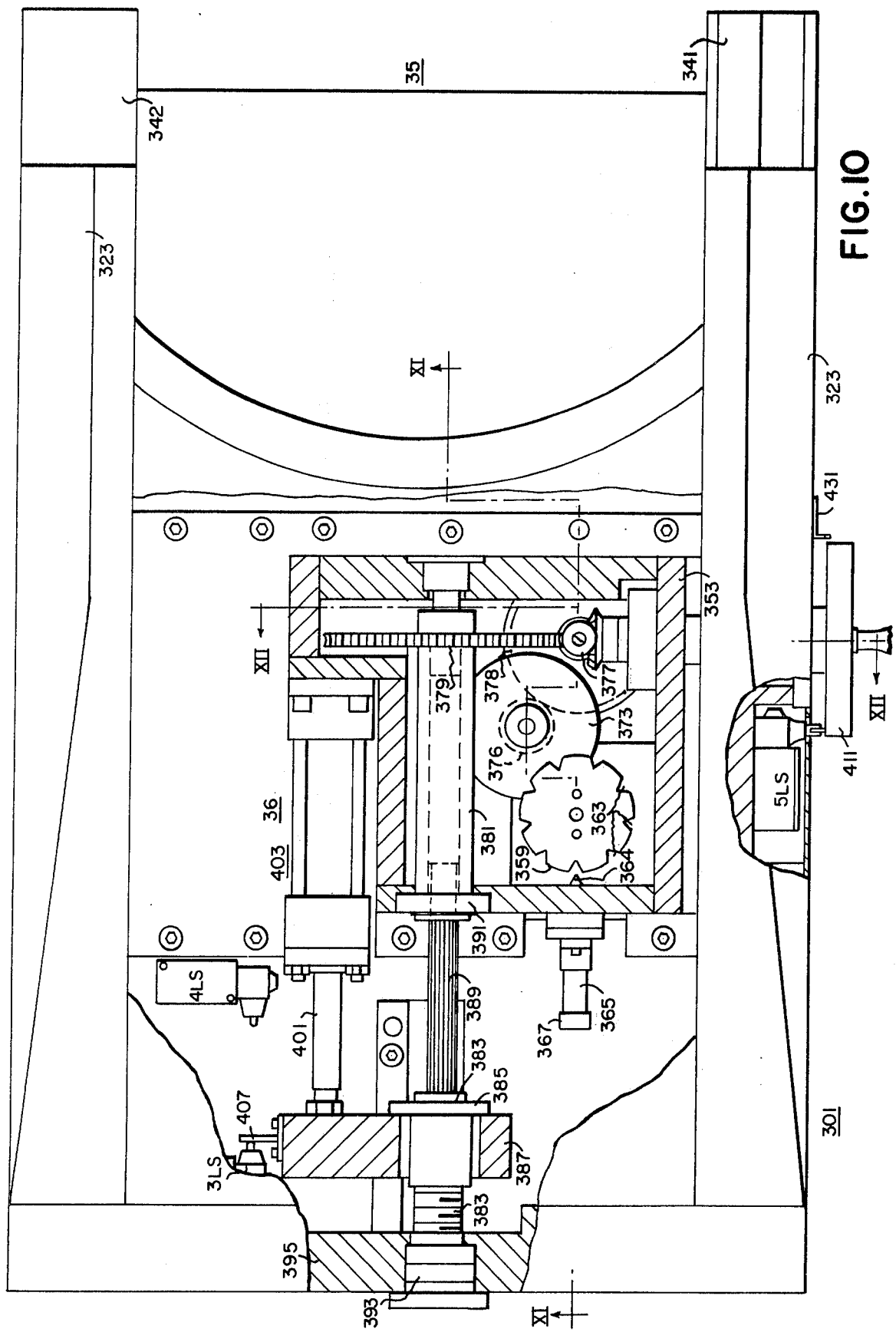
FIG. 10 is a view in section taken along line x—x of FIG. 11 showing the mechanism for moving the grinding wheel and its support by precise increments during a grinding operation.

The rapid traverse is effected hydraulically by operation of piston 401 in cylinder 403. In FIG. 10 piston 401 is shown in the retracted position with the grinding wheel 271 retracted from the work 103. Piston 401 is secured to feed-bar 387. The movement of piston 401 under the action of cylinder 403 inwardly or outwardly moves feed-bar 387, the horizontal slide 301, and the grinding wheel 271 correspondingly. The stem 389 slides in the spline in shaft 381. Feed-bar 387 carries a dog 407 (FIG. 10) which in the extreme positions of the piston 401 actuates limit switch 3LS or limit switch 4LS.

Figure 12:
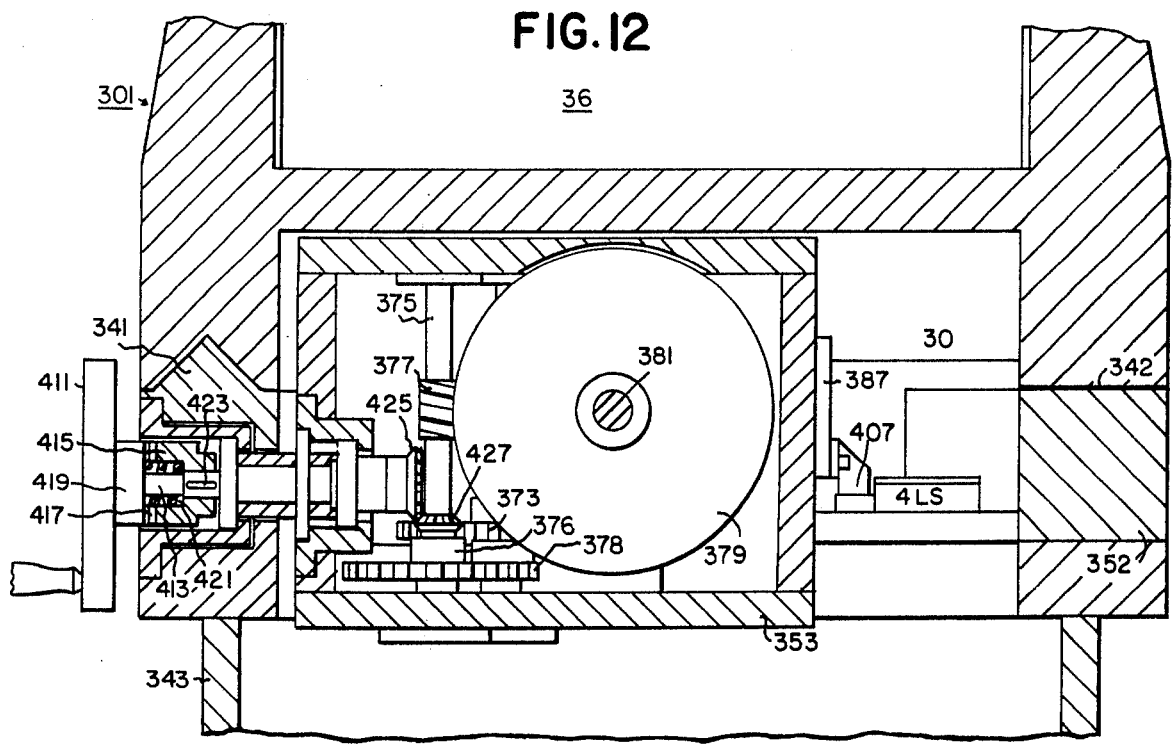
FIG. 12 is a view in section taken along line XII—XII of FIG. 10.

The grinding wheel 271 may be driven towards and away from the work 103 manually through the worm 377 and worm wheel 379 by a hand-wheel 411. The hand-wheel 411 is freely rotatable on a shaft 413 and may be connected to the shaft 413 by a coupling 415 (FIG. 12). The coupling 415 has teeth 417 which can be meshed with teeth in the end of a boss 419 on the hand-wheel 411 when the hand-wheel is pressed inwardly against the action of spring 421. The coupling 415 is keyed to the shaft 413 at key-slot 423.

Shaft 413 carries, at its end, a bevel gear 425 which meshes with bevel gear 427 on shaft 375 that carries worm 377. When the hand-wheel 411 is pressed inwardly, so that the teeth 417 are engaged, and turned, ball screw 383 is rotated in ball nut 385 and horizontal slide 301 is advanced or retracted to advance or retract grinding wheel 271. Hand-wheel 411 has a scale (not shown). A pointer 431 (FIG. 10) is provided adjacent the wheel 411 to correlate the position of wheel 411 and the grinding wheel 271.

A limit switch 5LS (FIG. 10) is provided in wheel-head feed housing 352 adjacent the wheel 411. This limit switch 5LS is actuated when the wheel is pressed inwardly relaxing the fluid pressure on motor 351 and permitting rotation of shaft 375.

At the start of an operation the head-stock 51 and tail-stock 53 are centered. For this purpose the centering pin 487 is inserted in an opening in the cam shaft 63 and turned with handle 489 so that its pin 491 locks in groove 493 (bayonet lock). The pressure is then reduced in cylinder 501 and the cam 65 disengaged from the follower 441 and the head-stock 51 and tail-stock 53 are turned with a centering gauge (not shown) against the head-stock center 61. If the gauge does not remain at 0° for a 360° turn, adjustment is necessary.

Next the pin 487 is unlocked from the shaft 59 and the pressure applying assembly 481 is set to apply pressure to the head-stock 51 and between the cam 65 and cam follower 441. The head-stock is now rotated through 360° with the centering gauge against the head-stock center 61. The cam follower 441 is now adjusted as disclosed in the parent patent so that the maximum excursions of the head-stock center 61 about the lowest innermost and highest outermost positions are equal.

Figure 13:
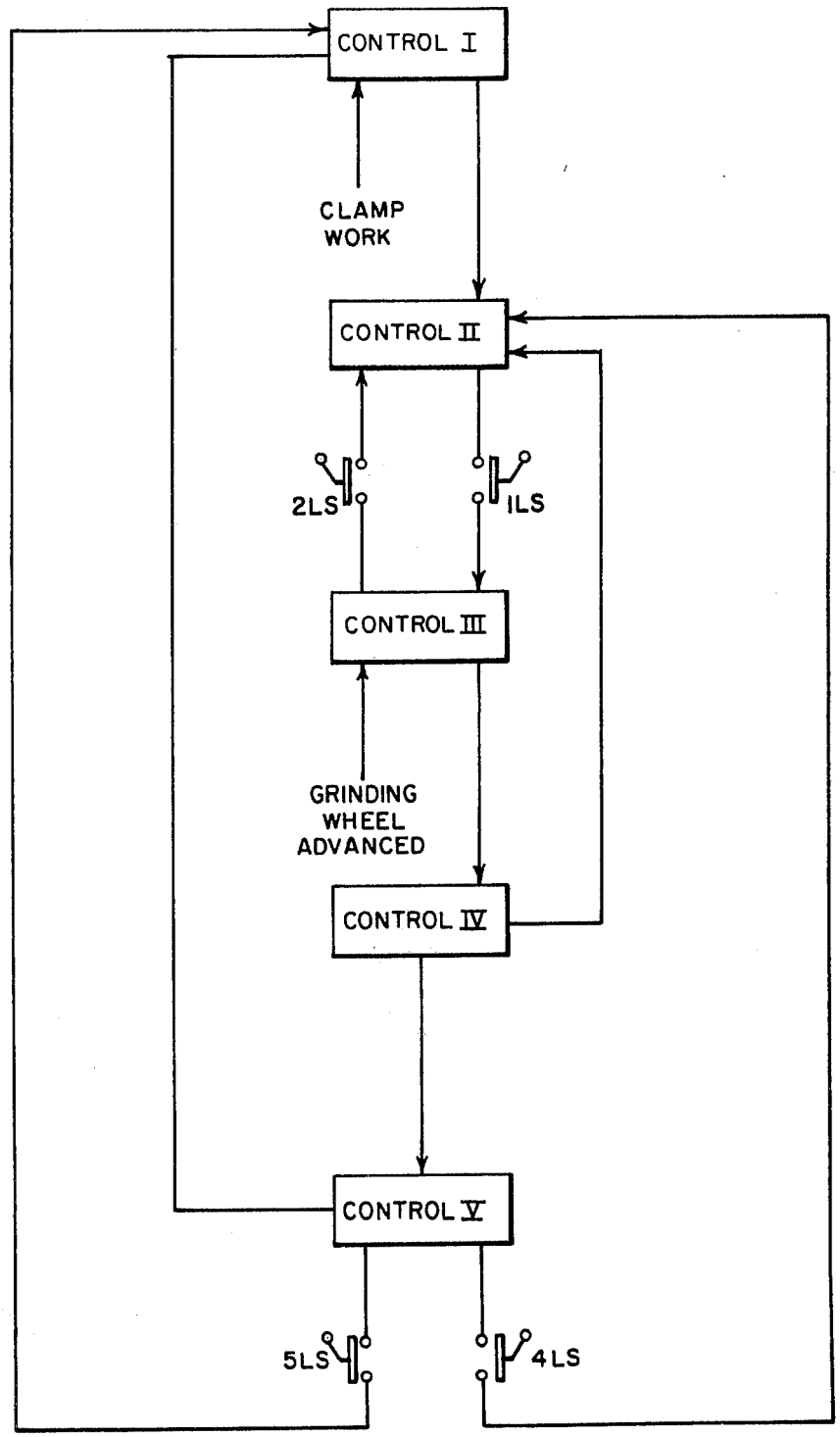
FIG. 13 is a block diagram showing the manner in which the apparatus according to this invention is controlled during a grinding operation.

The operation of the apparatus will be described with reference to FIG. 13. Controls I, II, III, IV and V in FIG. 13 are presented separately for convenience in explaining the operation. In the typical practice of this invention these Controls I through V will be included in a single control unit.

Figure 11:
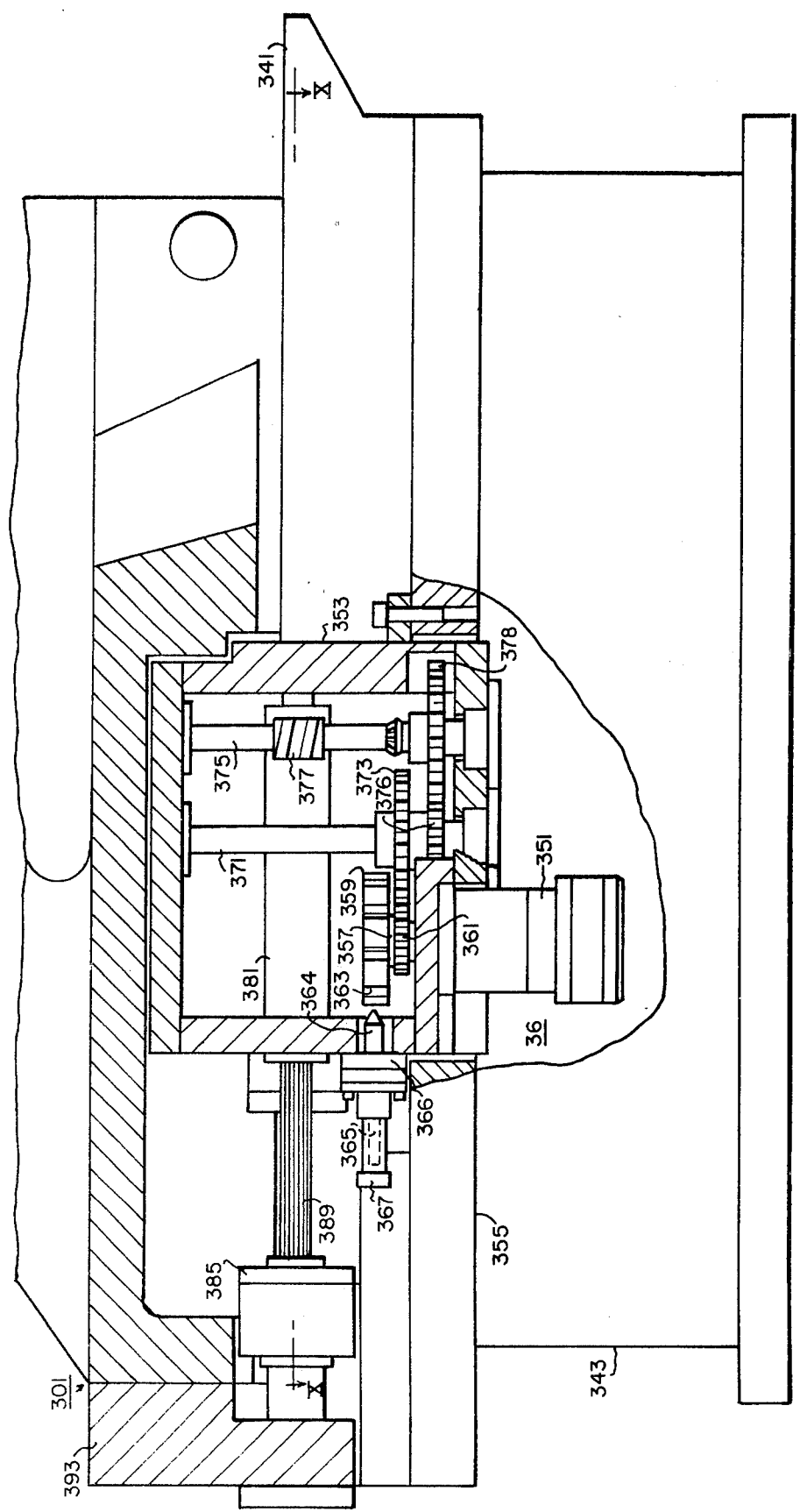
FIG. 11 is a view in section taken along line XI—XI of FIG. 10.

It may be assumed that at the start of an operation the grinding wheel 271 is retracted and switch 5LS is actuated. Handwheel 305 is operated to set the grinding wheel 271 at a predetermined angle to the work 103. Now Control I is actuated to cause fluid to flow through conductor 105 to clamp the work 103. Control V now actuates cylinder 403 to move the grinding wheel 271 to grinding position. Actuation of switch 5LS is interrupted and switch 4LS is actuated. This enables Control II to actuate cylinders 287 to reciprocate the grinding wheel 271 upwardly and downwardly along the stack 103 (FIG. 2). At the end of the upward movement switch 1LS is actuated enabling Control III to cause motor 351 to advance the grinding wheel 271 towards the work 103 a predetermined precise preselected distance measured by the number of detents 363 in disk 359 (FIGS. 10, 11). When this number is counted out Control III actuated cylinder 365 to snap shot pin 364 into the last detent. At this point Control II actuates cylinders 287 to move the grinding wheel downwardly. Switch 1LS is deactuated and at the end of the down traverse switch 2LS is actuated further advancing the grinding wheel 271 towards the work 103. This process is repeated until the grinding wheel 271 is advanced a predetermined distance. Control IV is then enabled to stop the advance of the wheel 271 but cylinders 287 continue to reciprocate the wheel during the spark out. At the end of the spark out Control V stops the reciprocation of the wheel 271 and retracts the wheel deactuating switch 4LS and actuating 5LS. Switch 5LS serves to unclamp the work 103. The finished work 103 is removed and replaced.

While a preferred embodiment of this invention has been disclosed herein, many modifications thereof are feasible. This invention is not to be restricted except insofar as is necessitated by the spirit of the prior art.

I claim:

1. Apparatus for shaping work in the form of a plurality of blanks of the tungsten-carbide type whose edges are to be ground including means for mounting a stack of said blanks with their edges to be ground extending vertically, said mounting means including vertically extending head-stock and tail-stock for clamping the stack of blanks between them with said edges exposed, a grinding wheel having a periphery of substantially smaller width than the height of said stack engaging said edges, means for moving said grinding wheel vertically along said stack with said periphery in grinding engagement with said edges, and means for controlling the relative positions of said edges and said grinding wheel.

2. The apparatus of claim 1 wherein clamping force is applied to the stack which is adequate to suppress buckling of the stack under the force applied by the grinding wheel.

3. The apparatus of claim 1 wherein the blanks have clean and flat surfaces.

4. The apparatus of claim 1 including means, connected to the wheel, for setting the wheel with its periphery at a selectable angle to the stack.

5. The apparatus of claim 1 including means for centering the stack between the head-stock and the tail-stock.

6. The method of shaping blanks of the tungsten-carbide type by grinding the edges of said blanks with apparatus including a head-stock and a tail-stock and a grinding wheel, the said method comprising clamping a stack of said blanks vertically between said head-stock and said tail-stock, said stack having a height substantially greater than the width of the periphery of said wheel, rotating the stack, engaging the periphery of said grinding wheel in grinding engagement with the edges of said blanks along said stack while said stack is rotating, and while said stack is rotating and said periphery of said wheel is in grinding engagement with said edges moving said wheel vertically along said stack to shape all said blanks in said stack.

7. The method of claim 6 wherein the force applied by the head-stock and the tail-stock is sufficient to suppress buckling under the force applied by the grinding wheel.

8. The method of claim 6 wherein the blanks have clean and flat surfaces.

* * * * *